United States Patent Office 3,357,895

Patented Dec. 12, 1967

1

2

3,357,895
PROCESS FOR PRODUCING FUNGUS SPORES

Edward Cherry, Frederick, Md., assignor to the United States of America as represented by the Secretary of the Army No Drawing. Filed May 26, 1964, Ser. No. 370,380
3 Claims. (Cl. 195—81)

The invention described herein may be manufactured and used by or for the Government of the United States of America for governmental purposes without the payment to me of any royalty thereon.

This invention relates to a process of producing fungus spores.

The spore form of various fungi causes crop diseases, such as cereal rusts, caused by various rust fungi, and rice blast, caused by *Piricularia oryzae*. In order to study these and other diseases and to develop resistant varieties of the plants affected, it is necessary that spores be available for conducting tests. Incubation of most spore forming fungi by liquid culture in a nutrient solution produces many mycelia, but few, if any, spores. In order to produce these spores therefore, an efficient surface culture method was needed, and the provision of such a process is an object of this invention. Another object of this invention is providing a method of recovering the spores obtained by the process of this invention.

In general, the process of this invention comprises growing a fungus upon a grain substrate, including the fungus until sporulation is substantially complete, and recovering the spores from the substrate.

A variety of substrates were tested to find one that would meet the requirements of containing the nutritional requirements for sporulation of the fungus, retaining its physical structure in the moist state without fragmentation or distortion under moderate agitation, and withstanding sterilization temperatures for periods of several hours without decomposition of the nutrients. It was found that various grain substrates met all of these requirements.

The ideal grain substrate should provide the nutritional and physical requirements necessary for maximum growth of fungus mycelium and sporulation. The most desirable physical characteristic is absence of clumping following steeping and autoclaving. Another desirable physical characteristic is that of presenting maximum area for sporulation. The grain substrate may be either whole or ground, such as corn, wheat, oats, sorghum, rye barley, rice and others. More spores were produced on whole corn than on most of the other grain substrates. It was found that sorghum and rice supported more sporulation than corn, but use of these materials has its difficulties. If a short steeping period is used, insufficient moisture is absorbed to support mycelial growth. On the other hand, when sorghum or rice is steeped to absorb the optimum amount of moisture and sterilized, the substrate was rendered pasty and unsuitable for use. Overall therefore, whole corn was found to be the preferred grain substrate.

Steeping the grain substrate involves placing the grain substrate and water into a flask and steeping in an autoclave. This treatment solubilizes the nutrients and makes them available to the fungus to be grown thereon. The grain imbibes water to a moisture content of about 63% by weight. Excess water is drained off and the flask and steeped grain substrate contained therein are autoclaved to effect sterilization.

After the sterilized substrate has cooled to room temperature, it is aseptically inoculated with a spore suspension. The amount and concentration of the spores must be sufficient to establish growth throughout the substrate.

The incubation of the fungus is effected aerobically by continuously passing filtered, humidified air over the substrate surface. The optimum incubation temperature depends upon the particular fungus incubated. For *Piricularia oryzae*, optimum sporulation occurs when the incubation temperature is maintained at about 28° C., with sporulation being reduced if the temperature varies more than two degrees therefrom.

Incubation is continued for about five days to obtain maximum sporulation. The contents of the flask are shaken once every 24 hours, except for the final day of incubation, to break up any clumps.

Before the spores may be removed from the substrate, the moisture content must be reduced from about 63% by weight to less than 10%, preferably about 5% to 8%, to avoid development of contaminants or the deterioration of the spores. The drying time should not exceed about 48 hours and the temperature should not exceed about 104° F. to prevent deleteriously affecting the spores.

After drying, the spores are ready to be removed from the substrate. This removal may be accomplished either mechanically or by non-aqueous solvent washing.

The mechanical procedure comprises connecting the flask containing the spore carrying substrate to a cyclone separator. The flask and its contents are shaken and air drawn from the flask into the separator by means of a vacuum pump. The spores are collected in the separator. A bag filter may be substituted for the cyclone separator. Mechanical removal has several disadvantages however. The product is heavily contaminated with material other than spores, such as seed coat, mycelia, and starch fragments and a substantial portion of the spores are damaged by the harsh treatment. Also, this method does not effect complete removal of the spores from the substrate.

The preferred method of recovering the spores is accomplished by washing the spore containing substrate with a non-aqueous solvent to remove the spores therefrom, followed by recovery of the spores from the spore suspensin in the solvent. Solvents that may be used include 1,1,1-trichloroethane, carbon tetrachloride, chloroform, ethylacetate, diethyl ether, acetone, petroleum ether, white gasoline, ligroin and benzene. Several washings may be performed to substantially completely remove all of the spores from the substrate. The spore suspension is filtered to remove the spores from the solvent, and the filter cakes dried at about 40° C. for approximately 24 hours. The dried cakes are then forced through a screen to yield a dry powder consisting principally of viable fungus spores with a minor portion of mycelial fragments. This product may be stored in sealed containers until needed for use.

The following example illustrates the described process used in growing the spores of *Piricularia oryzae*, the rice blast fungus. It is to be understood that this is an example only, and is not limiting upon the production of *Piricularia oryzae* spores, or any other fungus spores.

EXAMPLE 200 grams of whole yellow corn and 230 ml. of distilled water are introduced into a 2800 ml. Fernbach flask. The corn is steeped in a steam autoclave for 30 minues at 5 p.s.i. The flask is then fitted with a three-hole stopper having an air supply tube, air exhaust tube, and inoculating tube. The air supply tube extends down to just above the surface of the steeped corn. The air exhaust tube is covered with cotton wool. The inoculating tube is fitted with a serum cap. The entire apparatus and its contents are sterilized by autoclaving at 15 p.s.i. for 30 minutes. The sterilized apparatus and contents are cooled to room temperature. The steeped corn is then aseptically inoculated with a spore suspension of *P. oryzae* prepared aseptically in any conventional manner from a pure culture. The inoculation is effected by introducing 10 ml. of inoculum containing approximately 50,000 spores per ml. into the flask by sterile hypodermic syringe. The inoculum is distributed uniformly throughout the steeped corn by shaking the flask and its contents. Filtered humidified air is passed through the apparatus at a rate of about 200 ml. per minute. The air supply is humidified by bubbling the air through a container of distilled water. Incubation is continued for 5 days at 28° C. The contents of the flask are shaken every 24 hours, except for the last day, the substrate being levelled off after each shaking. The spore containing corn is dried at 40° C. for 24 hours. The resulting moisture content is about 8% by weight. After drying, 400 ml. of 1,1,1-trichloroethane is added to the flask, and the mixture agitated. This solvent is preferred because it is non-flammable and has a low toxicity. This produces a spore suspension which is then drawn off and filtered through a Buchner funnel equipped with a medium to coarse filter paper. This process is repeated until no further spores are obtained from the corn. The filter cakes are dried by placing them into a dryer at 40° C. for 24 hours. The dried cakes are forced through a 16 mesh screen, yielding a dry powder consisting principally of *P. oryzae* spores having a moisture content of about 3% by weight. This product is then stored in a sealed container at 4° C. until needed.

While the foregoing specific example was directed to producing spores of *P. oryzae*, it is obvious that the process of this invention may be employed to obtain the spores of other fungi. The process is useful in obtaining spores of Penicillin species. Aspergillus species, Helminthosproium species, and others.

The process of this invention is useful not only in producing spores for use in plant pathology studies, but also for use in antibiotic production, feed supplement production, allergen preparation, and fungal genetics research.

I claim:

1. In a process for the production of fungus spores which comprises growing the fungus upon a grain substrate selected from the group consisting of corn, wheat, oats, sorghum, rye, barley, and rice until sporulation has occurred and recovering the spores from the substrate, the improvement comprising: the addition of a non-aqueous organic solvent to the dried spore containing substrate, agitating to remove the spores from the substrate, drawing off the resulting spore suspension and recovering the fungus spores.

2. A process in accordance with claim 1 wherein the fungus is *Piricularia oryzae*.

3. A process in accordance with claim 1 wherein the non-aqueous organic solvent is selected from the group consisting of 1,1,1-trichloroethane, carbon tetrachloride, chloroform, ethylacetate, diethyl ether, white gasoline, ligroin and benzene.

References Cited

UNITED STATES PATENTS

| | | | |
|---|---|---|---|
| 3,000,791 | 9/1961 | Schweiger | 195—81 X |
| 3,011,948 | 12/1961 | Gaeumann et al. | 195—81 X |

LIONEL M. SHAPIRO, *Primary Examiner.*

BENJAMIN R. PADGETT, CARL D. QUARFORTH, *Examiners.*

S. J. LECHERT, *Assistant Examiner.*